Aug. 21, 1934.  E. A. BOLEN  1,970,686

MEASURING DEVICE FOR VENDING MACHINES

Filed March 7, 1931

Inventor:
Emerson A. Bolen
By Harry C. Schultz
Atty.

Patented Aug. 21, 1934

1,970,686

UNITED STATES PATENT OFFICE 1,970,686

MEASURING DEVICE FOR VENDING MACHINES

Emerson A. Bolen, Morris, Ill., assignor to Northwestern Corporation, Morris, Ill., a corporation of Illinois Application March 7, 1931, Serial No. 520,957

4 Claims. (Cl. 221—108)

This invention relates to measuring devices and more particularly to devices for measuring the quantity delivery of vending machines.

It contemplates more especially the provision of novel means for measuring the delivery of vendible articles of a delicate nature so that crushing or any impairment thereof is precluded. Obviously, the crushing or impairment of edibles such as mints during their delivery from a vending machine, would render such unsaleable and totally defective.

Numerous types of measuring devices have heretofore been proposed for vending machines but these are not suitable for delicate edibles which are prone to crush, chip or disintegrate upon the application of the slightest resistance of any character thereto. The confinement thereof and delivery in connection with a measuring device usually effects disintegration or at least mild crushing which is not satisfactory in any degree. For that reason the edibles or delicate vendible articles of any character must be capable of delivery from a vending machine without the slightest impairment thereto.

One object of the present invention is to simplify the construction and improve the operation of devices of the character mentioned.

Another object is to provide novel means for measuring articles and controlling their discharge from a vending machine without the slightest physical impairment thereof.

Still another object is to provide a means for measuring vendible articles so that a uniform quantity will be dispensed or delivered responsive to any predetermined operation of the instrumentality.

A further object is to provide a measuring device for vending edibles which insures uniform quantity delivery without any appreciable physical impairment thereof.

A still further object is to provide a yieldable device for measuring the article discharge from a vending device without the slightest impairment of the articles or any appreciable variation in successive quantity discharges.

Still a further object is to provide a yieldable apron in the delivery path of vendible articles for the purpose of measuring the quantity discharge thereof without physical impairment thereto.

Other objects and advantages will appear from the following description of an illustrative embodiment of the present invention.

Figure 1:
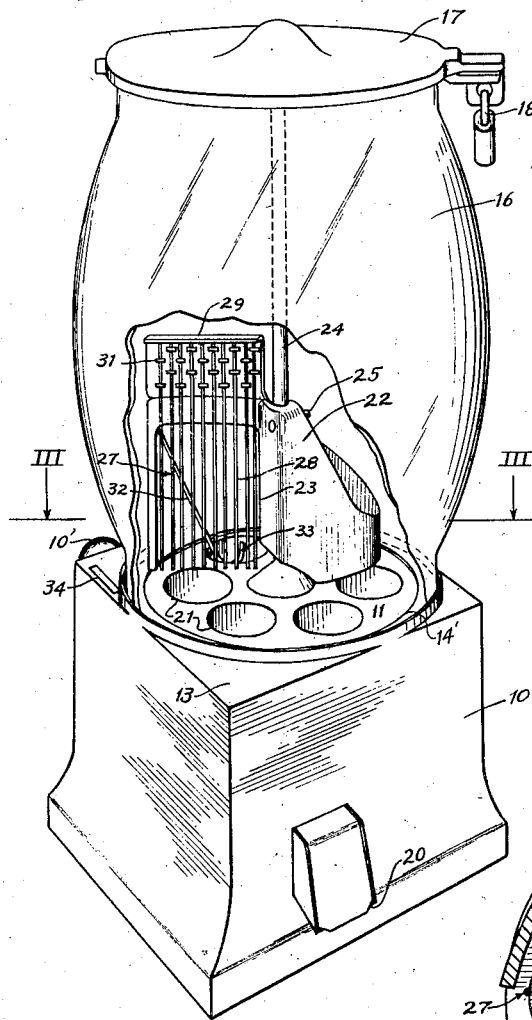
Figure 1 is a perspective view of a device embodying features of the present invention.
Figure 2:
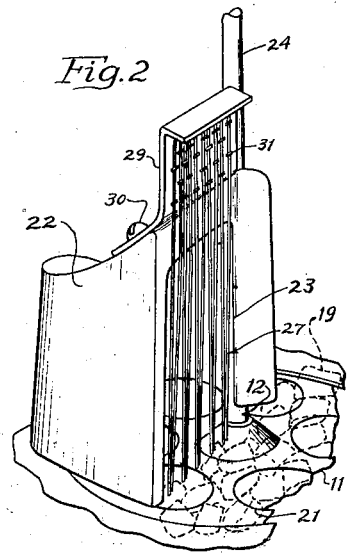
Figure 2 is an enlarged fragmentary perspective view of the measuring device shown in Figure 1.
Figure 3:
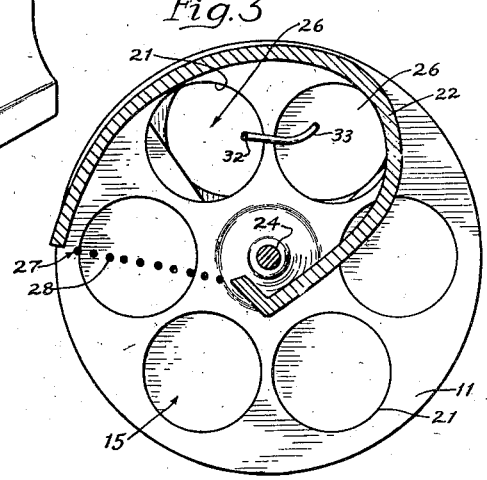
Figure 3 is a sectional view taken substantially along line III—III of Figure 1.
Figure 4:
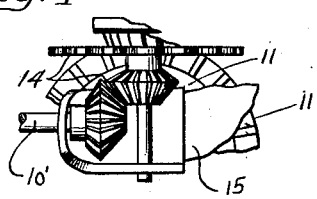
Figure 4 is an enlarged fragmentary view in elevation of the gear mechanism that operatively connects the handle shaft 10' with the disc rotor 11.

The structure selected for illustration comprises a base 10 cast or otherwise shaped from sheet material to devise an enclosure for vending machine operating mechanism of any standard or approved construction. A handle 10' projects exteriorly from the base 10 for cooperation with the operating mechanism (not shown) so as to impart rotation to a disk 11.

The disk or rotor 11 is aligned for rotation about a vertical shaft 12 projecting axially downward for support by the top 13 of the base 10. The rotor 11 is journalled thereon for operative connection to a knob handle 10' through a set of meshed gears 14. As shown the top surface 13 of the base 10 is provided with a vertically extending cylindric cavity 14' for the reception of the correspondingly shaped rotor 11 which is of somewhat smaller diameter for rotation in contact with a flat surface 15. An article confining chamber such as a glass container 16 is shaped for telescopic association with the cylindrical cavity 14' for the confinement of any suitable vendible articles such as candy mints therein. The container 16 is preferably provided with a top or closure 17 capable of locked attachment thereto by resort to any suitable key operated expedient 18 so as to preclude unauthorized access to the interior of the transparent container 16.

In order to measure the discharge of the vendible articles such as the mints 19 through any suitable discharge orifice 20 provided in the base 10, the rotor 11 is provided with a circumferential series of uniformly spaced bores 21, in this instance six, which are vertically cylindrical for extension entirely through the rotor 11 in communication with the flat surface 15 of the top surface cavity 14' provided in the base 10. These cylindrical bores or pockets 21 receive the mints 19 therein through the influence and urge of gravity so as to completely fill the interior thereof for movement along a predetermined path defined by the rotation of the disc 11. A discharge housing 22 is cast or otherwise shaped in any suitable manner to provide an entrant orifice 23 disposed in the path of the cylindrical pockets 21 of the rotor 11. To this end, the housing 22 is fixed to a vertical rod 24 disposed axially through the container 16 to constitute an extension of the rotor shaft 12. A pin or other suitable fastener 25 projects through the tubular housing 22 for attachment to the shaft 24, thereby maintaining the housing 22 stationary in a fixed position.

The top surface 15 which constitutes the bottom for the rotor pockets 21 is provided with a discharge opening or orifice 26 therein in registry with the tubular housing 22 for communication with the discharge or delivery passage 20 provided in the base 10. In consequence thereof, the vendible articles will be carried in the pockets 21 along a circumferential path within the housing 22 for delivery through the openings 26 in the bottom plate 15 for gravity discharge in an obvious manner.

In order to carefully measure and uniformly control the number of vendible articles such as the mints 19 discharged through the opening 26 in registered communication with the interior of the housing 22, a yieldable apron or shield 27 bridges the entrant orifice 23 of the housing 22. The apron 27 depends, in this instance, proximate to the top surface of the rotor 11, thereby precluding the mints 19 from passing to the discharge housing 22 except for that quantity which is within the confines of the cylindrical bores or pockets 21. In the present embodiment, the yieldable apron 27 consists of a series of closely associated resilient wire rods 28 which extend vertically for anchorage attachment to a bracket plate 29, in this instance detachably associated with the housing 22 by means of screw fasteners 30.

To this end, the plate 29 is provided with an alternate series of vertically aligned loops 31 stamped or otherwise shaped therefrom to receive the ends of the wire rods 28 therethrough for fixed attachment. The wire rods 28 extend downwardly in a common plane proximate to the top surface of the rotor 11, thereby forming an apron for the entrant housing orifice 23 so as to preclude the discharge of any vendible articles except those within the confines of the rotor pockets 21. Should an article 19 be disposed in an intermediate plane so as to be carried by the rotor pockets 21, then the wires 28 will yield both laterally and in the direction of delivery movement to permit passage of the vendible articles without sufficient obstruction to impair or disintegrate the physical mass thereof.

Obviously, there may be one or two such articles projecting from the pockets 21, thereby insuring the uniformly measured discharge within a variation of one or two small articles such as mints 19; however, disintegration or physical impairment is not effected in any event. In order to preclude any possible obstruction through the discharge pocket 21, a wire 32 is anchored to the housing 22 for projection within the pocket 21 most proximate to the end wall of the housing 22, it having a hooked end 33 so as to agitate the articles confined within the particular pocket 21 arriving at the discharge station in communication with the opening 26 in the plate 15.

It is thus apparent that the yieldable apron 27 measures the discharge within the requirements of commercial practice without impairment to the articles, and further the quantity is governed by the extent of rotation of the disc 11. The extent of rotation of the disc 11 is governed by the coin control mechanism (not shown) of any standard or approved construction which is operatively responsive to the deposition of a coin through a slot 34 with subsequent manipulation of the handle 10'. It is obvious that the measuring device described supra may be employed in devices other than coin operators and that various changes may be made in the embodiment of the invention herein specifically described without departing from or sacrificing any of the advantages of the invention as defined in the appended claims.

I claim:

1. In a vending machine, the combination of a base, a top plate for said base, said top plate being provided with a discharge orifice, a rotor disc having article receiving bores therein rotatably mounted above said top plate, means within the base for advancing the rotor step by step to register successively the said bores with the discharge orifice of the top plate, a container for vendable articles mounted on the base and enclosing said rotor, a fixed shaft extending from the base about which the rotor is journaled, said shaft passing into the container, a housing having an entrance opening affixed to said shaft in a stationary position and covering a portion of the rotor above the discharge orifice, means on the housing above its entrance opening, resilient rods secured to said means and extending downward across the entrance opening in the housing to the top surface of the rotor, whereby articles protruding above the said bores of the rotor are prevented from entering the housing without damage to the articles to be dispensed.

2. In a vending machine as set forth in claim 1, the rod securing means comprising a bracket provided with loops for securing said resilient rods.

3. In a vending machine as set forth in claim 1, resilient agitating means mounted within said housing and overlying said discharge orifice and yieldably extending within the top of the bore registering with said discharge orifice, whereby upon each successive registration of bore and orifice, the material carried in said bore will be readily ejected therefrom.

4. In a vending machine, the combination of a base, a top plate for said base, said top plate being provided with a discharge orifice, a rotor disc having article receiving bores therein rotatably mounted above said top plate, means within the base for advancing the rotor step by step to register successively the said bores with the discharge orifice of the top plate, a container for vendable articles mounted on the base and enclosing said rotor, a shaft extending from the base about which the rotor is journaled, said shaft passing into the container, a housing having an entrance opening affixed to said shaft in a stationary position and covering a portion of the rotor above the discharge orifice, rod securing means comprising a bracket provided with loops mounted on the housing above its entrance opening, resilient rods secured to said bracket by said loops, and extending downward across the entrance opening in the housing to the top surface of the rotor, whereby articles protruding above the said bores of the rotor are prevented from entering the housing without damage to the articles to be dispensed, and resilient agitating means mounted within said housing and overlying said discharge orifice and yieldably extending within the top of the bore registering with said discharge orifice, whereby upon each successive registration of bore and orifice, the material carried in said bore will be readily ejected therefrom.

EMERSON A. BOLEN.